UNITED STATES PATENT OFFICE 2,688,175

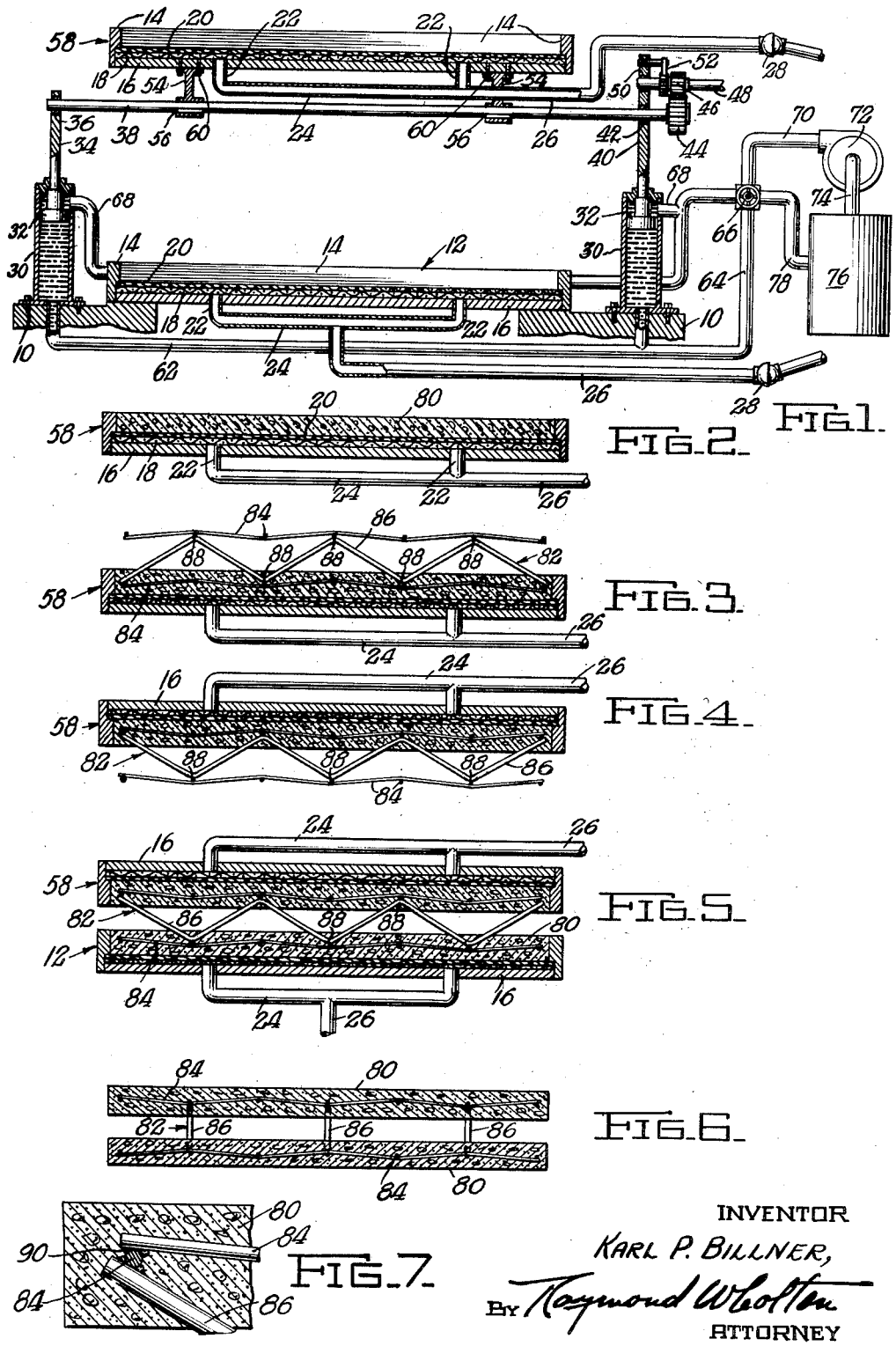

METHOD AND APPARATUS FOR MOLDING REINFORCED CONCRETE PRODUCTS

Karl P. Billner, Philadelphia, Pa., assignor to Vacuum Concrete, Inc., a corporation of Pennsylvania Application August 11, 1947, Serial No. 768,001

9 Claims. (Cl. 25—154)

This invention relates to a method and apparatus for molding plastic compositions, such as those comprising cement or concrete, containing vehicle in excess of that required for setting, which are poured and then deprived of a portion of the excess vehicle by the simultaneous application of subambient pressures and atmospheric compacting pressures which complement the subambient pressures.

The practical application of these principles was first realized in accordance with the disclosure of the patent to Billner, 2,046,867, dated July 7, 1936, although there had been many previous but unsuccessful attempts in this behalf, as exemplified by the disclosures of the patents to Haddan, British No. 25,304, dated November 30, 1898; Marks, British No. 6,751, dated March 17, 1914; and Gordon, No. 1,945,145, dated January 30, 1934; among others. Whereas the removal of a portion of the water from plastic concrete mixes had been thus contemplated over many decades, it was the work of the present inventor which achieved the first practical results which have since been acclaimed throughout the industry as being not only superior in physical properties as compared with any other method or products, but less expensive.

By virtue of additional research, it has now become possible to extend these principles for operations with an open mold into which the plastic composition is poured, followed by the production of a subambient pressure intermediate the composition and a portion of the mold accompanied by the simultaneous application of atmospheric pressure to the exposed surface of the composition, as distinguished from drawing atmospheric air through the composition in the manner contemplated in the British patent to Marks to which reference has been made above.

This invention accordingly proposes a molding method comprising introducing a plastic composition containing excess vehicle into an open mold, and producing a subambient pressure intermediate the composition and a portion of the mold, which pressure may be applied while inverting the mold to retain the plastic composition therein. The effect of the subambient pressure will withdraw a portion of the vehicle in excess of that required for hardening, which is of particular importance where the plastic composition possesses setting properties of the type inherent to Portland cement. The manner in which a surface portion of the composition in the mold is exposed to atmosphere will serve to compact the mass in response to the application of subambient ressure of a value sufficient to retain the plastic composition in position during and after inversion of the mold. Subambient pressures of at least one inch of mercury per inch thickness of the composition, applied intermediate the composition and the bottom of the mold will satisfy the required results under some circumstances, although higher values up to those feasible with existing commercial vacuum pumps, depending somewhat upon the consistency of the mix and its thickness, will produce the results effectively and more rapidly. Accordingly, for thicknesses of commercial cement or concrete mixes of three inches or more, a subambient pressure of fifteen inches of mercury or greater will be generally satisfactory.

The plastic composition will engage the bottom and sides of the open mold to an extent sufficient to prevent the passage of atmospheric air therethrough, thus assuring the presence of the compacting effect which is so desirable. The plastic composition containing excess vehicle may be introduced into two or more open molds having spacing means partially embedded therein, and a portion of the vehicle removed by the application of subambient pressures intermediate a portion of each mold and its contents. The production of interconnected spaced walls defining an intermediate insulating space is readily accomplished in accordance with this invention by introducing a plastic composition containing excess vehicle into an open mold, partially embedding a spacing member or frame in the composition, producing a subambient pressure intermediate the composition and the bottom of the mold, inverting the mold while maintaining such pressure conditions, introducing a plastic composition containing excess vehicle into another open mold, relatively moving the molds to partially embed the spacing member in the composition of the second mold, producing a subambient pressure intermediate the bottom of the second mold and its composition, relieving the pressure after the composition becomes sufficiently firm, and removing the molds after the product becomes self-supporting.

The sides of the mold are preferably water impervious and define with a base an open top container; the base may be surmounted by discontinuous spacing means over which a water pervious barrier is provided to define the bottom of the mold; and below the barrier there is provided means for connecting a source of subambient pressure. Arcuate movement of the mold or molds may be effected by suitable inverting mechanism, and appropriate apparatus for imparting relative rectilinear motion to the mold or molds is likewise contemplated.

A more complete understanding of the invention will follow from a detailed description of the examples depicted in the accompanying drawings wherein:

Fig. 1 is a somewhat diagrammatic sectional elevation of apparatus of the type contemplated;

Fig. 2 is a sectional elevation of one of the molds depicted in Fig. 1 containing a plastic composition;

Fig. 3 is a sectional elevation similar to that shown in Fig. 2 wherein a spacing member has been partially embedded in the composition;

Fig. 4 is a sectional view corresponding to the showing of Fig. 3 with the mold inverted;

Fig. 5 is a sectional elevation depicting the molds of Fig. 1 in a different relationship assumed during a molding operation;

Fig. 6 is a sectional elevation of the molded product taken at right angles to the position depicted in Fig. 5; and Fig. 7 is an enlarged fragmentary detail of a portion of the product depicted in Fig. 5.

With particular reference to Fig. 1, the apparatus comprises spaced supports 10 for a mold 12 having an open top defined by sides 14 and a base 16. The upper surface of the base is provided with spacing means 18 which may assume the form of a metallic mesh as shown, which in turn receives on its upper surface a water pervious barrier 20 which may assume the form of closely woven textile material through which moisture can pass readily but which will prevent the passage of such small particles as occur in a Portland cement or concrete mix. The base 16 is perforated to receive a plurality of tubes 22 which may be connected through a manifold 24 to an exhaust line 26 of flexible character which may be connected through a universal joint 28 to the suction side of an exhaust pump not shown.

A pair of hydraulic cylinders 30 are shown as suitably secured to the supports 10 beyond the mold 12, each receiving a piston 32 for vertical reciprocatory movement in synchronism. The piston depicted at the left side of Fig. 1 is provided with a piston rod 34 whose upper end receives a bearing 36 for one end of a shaft 38. The piston 32 depicted at the right side of the figure carries a piston rod 40 bored to receive a bearing 42 for the other end of the shaft 38. The shaft 38 can be rotated through an arc of not less than 180° by means of a spur gear 44 secured thereto near its right end in mesh with a driving gear 46, the driving gear being secured to a shaft 48 journalled in a bearing 50 carried by the piston rod 40. The shaft 48 may be actuated by power means or manually, and the position of the shaft 38 may be maintained by means of a dog 52, shown as pivotally retained on the piston rod 40 to serve as a detent.

A pair of brackets 54 are non rotatably secured to the shaft 38 by keys 56 or the like, to support a mold 58 to which they are secured by bolts 60. The mold 58 is constructed in the manner described with reference to the mold 12 and the corresponding parts have been similarly identified.

The head ends of the cylinders 30 are interconnected by a manifold 62 which is in turn connected by a conduit 64 to a multiway valve 66. Another port of the valve 66 is connected with the rod ends of the cylinders 30 by means of conduits 68. Another port of the valve 66 is connected by means of a conduit 70 with the pressure side of a pump 72 whose suction side is connected through a conduit 74 with a supply tank 76 which is likewise connected through a conduit 78 with a fourth port of the valve 66. Accordingly, with the closed hydraulic system thus described, with the valve 66 adjusted to one position, pressure from the pump 72 will be applied to the head ends of the cylinders 30 to elevate the pistons 32 and the mold 58 to the position shown in Fig. 1. With the valve adjusted to another position, pressure from the pump will be applied to the rod ends of the pistons to lower them and the mold 58 in a manner and for a purpose to be described.

With the apparatus in the position depicted in Fig. 1, the upper mold 58 will be filled with a plastic composition containing excess vehicle, such as a cementitious or concrete mix 80 shown in Fig. 2. A subambient pressure is then applied through the conduit 26 to become effective between the lower surface of the plastic composition 80 and the upper surface of the mold base 16, whereupon excess moisture or vehicle will be withdrawn from the mix through the water pervious barrier 20 maintained in spaced relationship with the upper surface of the base 16 by the spacing means 18.

At a suitable stage of the process, either before the subambient pressure is applied, or shortly thereafter, a spacing member or frame 82, shown in Fig. 3, is partially embedded in the plastic composition 80 to a desired depth. This spacing member or frame comprises a reinforcing mesh 84 secured by means of welding to a suitable number of bar joists 86 reversely bent to approach a sinusoidal configuration providing a plurality of nodes 88 at which they are welded to the woven mesh 84 disposed on opposite sides thereof. As shown in Fig. 3, such a frame 82 has been embedded in the concrete to approximately half the depth of the composition.

The subambient pressure between the plastic body and the base of the mold may be continued with the mold in its erect position until sufficient moisture has been withdrawn to solidify the composition. Then while continuing to maintain the subambient pressure, the mold is inverted to assume a position like that depicted in Fig. 4, by operation of apparatus along the lines of that shown in Fig. 1.

At some suitable stage of the operations, the lower mold 14 has been filled with a plastic composition 80 containing excess vehicle so that when the upper mold 58 in its inverted position is lowered in a suitable manner as by the hydraulic system represented in Fig. 1, the molds will assume a relationship like that depicted in Fig. 5 with the frame 82 now partially embedded in the Portland cement composition or other material, contained in each of the molds. Subambient pressure is likewise applied between the upper surface of the base of the mold 14 and the plastic composition contained therein until the desired amount of excess moisture has been withdrawn, so that when the cast bodies spaced by the frame 82 have become sufficiently self supporting, the subambient pressure can be discontinued and the finished product removed from the molds, which can then be restored to their initial positions in readiness for another operation.

A section of such a product, taken at right angles to the showing of Fig. 5, has been depicted in Fig. 6 of the drawings, and a detail on a somewhat enlarged scale appears in Fig. 7 wherein the welding material 90 for connecting the bar joists 82 with the mesh 84 can be shown to better advantage.

The subambient pressures will assume a value of at least one inch of mercury per inch thickness of the composition, particularly where the composition comprises Portland cement, and higher values up to those realized with existing commercial vacuum pumps are contemplated, the precise value depending somewhat upon the nature of the plastic mix and its thickness. For thicknesses of commercial cement or concrete mixes of three inches or more, a subambient pressure of 15 inches of mercury or greater will be generally satisfactory.

Inasmuch as the sides 14 of the molds remain in sealing contact with the plastic composition contained therein, and since the composition itself constitutes a seal against the passage of atmospheric air, it will follow that the pressure of atmosphere upon the exposed surfaces of the plastic composition will complement the subambient pressures employed, thus imposing a compacting force upon the plastic composition to produce in the completed product the same highly desirable characteristics that are inherent to the method as practiced in accordance with the Billner Patent 2,046,867 previously mentioned. The combined effects of subambient pressure between the mold and the plastic composition, and complementary atmospheric pressure on the exposed surface of the plastic composition, serve the additional purpose of retaining the composition in the mold even when inverted, thus greatly expediting the operation which would otherwise involve delays, require more molds, and increase operating costs accordingly.

Whereas but one form of apparatus has been described with reference to the somewhat diagrammatic showing of the drawings, and only one method has been set forth in detail, variations will occur to those skilled in the art as they have been recognized already by the present inventor, and accordingly, the invention should not be restricted to these examples beyond the scope of the appended claims.

I claim:

1. A molding method comprising introducing a plastic composition comprising Portland cement and water in excess of that required for hydration into a plurality of spaced open molds, shifting at least one of said molds to place said molds in opposition, partially embedding a common spacing member in the composition of each mold before said composition has set in either mold, and producing a subatmospheric pressure intermediate a portion of each mold and its composition to withdraw a portion of said excess water and retain the plastic composition in place.

2. A molding method comprising introducing a plastic composition containing excess vehicle into a pair of molds, tilting one of said molds while applying subatmospheric pressure to retain its plastic composition in place, partially embedding a common spacing member in the composition of each mold before said composition has set in either mold, and exerting a subatmospheric pressure intermediate a portion of each mold and its composition to withdraw a portion of said vehicle.

3. A molding method comprising introducing a plastic composition containing excess vehicle into an open mold, partially embedding a spacing member in said composition, producing a subatmospheric pressure intermediate said composition and a portion of said mold, inverting said mold before said composition has set, introducing a plastic composition containing excess vehicle into another open mold, partially embedding said spacing member in the composition of the second mold, and producing a subatmospheric pressure intermediate a portion of the second mold and its composition.

4. A molding method comprising introducing a plastic composition containing excess vehicle into an open mold, partially embedding a spacing member in said composition, producing a subatmospheric pressure intermediate said composition and a portion of said mold to remove excess vehicle from said composition, introducing a plastic composition containing excess vehicle into a second open mold, relatively moving said molds towards one another including angularly displacing at least one of said molds with respect to a horizontal plane to partially embed said member in the composition of the second said mold before the composition in either of said molds has set, and producing subatmospheric pressure intermediate a portion of the second said mold and the plastic composition therein to remove excess vehicle therefrom.

5. A molding method as defined in claim 4 wherein the relative movement of said molds is terminated to maintain the plastic compositions of the two molds in spaced relationship.

6. A molding method as defined in claim 4 wherein said molds are stripped after the plastic composition has become self supporting.

7. Panel molding apparatus comprising a pair of spaced open mold frames each having side walls and a filter bottom, means for applying a vacuum to the filter bottoms of the mold frames, means for inverting one of said mold frames to place said mold frames in opposition to each other, and means for relatively moving said mold frames toward and away from each other when they are positioned in opposition to each other, said vacuum applying means being adapted to remain secured to the filter bottoms of the mold frames in all positions on the mold frames.

8. The process of making a precast reinforced concrete building panel which comprises placing a mold frame having side walls and a suction bottom in a horizontal position, pouring concrete into the mold frame, inserting a unitary reinforcing structure into the concrete mass to partially embed the same therein, applying a vacuum to the concrete mass through said suction bottom, placing a second mold frame having side walls and a suction bottom in a horizontal position, pouring a second mass of concrete into the second mold frame, inverting the first mold frame over the second mold frame while continuing the application of the vacuum to the concrete in the first mold frame, bringing the mold frames close together until portions of the reinforcing structure are embedded in the concrete mass in the second mold frame, applying a vacuum to the concrete in the second mold frame, discontinuing the vacuum treatment of the concrete in the first mold frame and lifting the same from the concrete body formed therein, and discontinuing the application of vacuum to the concrete in the second mold frame and separating the finished panel from the second mold frame.

9. The process of making a precast reinforced concrete building panel which comprises placing a mold having a suction surface with said surface in a horizontal position, pouring concrete into the mold, inserting a unitary metal reinforcing structure in the mass of concrete with portions of this structure projecting above the mass of concrete, applying a vacuum to the concrete through said suction surface to draw water from the concrete through said suction surface and continuing the vacuum treatment until the concrete forms a coherent solid body, inverting the mold while continuing to apply the vacuum to the concrete mass and then discontinuing the vacuum treatment and separating the panel from the mold.

References Cited in the file of this patent

UNITED STATES PATENTS

| Number | Name | Date |
|---|---|---|
| 2,116,557 | Billner | May 10, 1938 |
| 2,175,715 | Denning | Oct. 10, 1939 |
| 2,305,684 | Foster | Dec. 22, 1942 |
| 2,321,449 | Armao | June 8, 1943 |
| 2,437,003 | Ruegg | Mar. 2, 1948 |